(12) United States Patent
Chuang (10) Patent No.: US 9,197,289 B2
(45) Date of Patent: Nov. 24, 2015

(54) DYNAMIC TRANSMIT POWER CONTROL METHOD AND POWER LINE COMMUNICATION SYSTEM

(75) Inventor: Dong-Ming Chuang, Hsinchu County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 1159 days.

(21) Appl. No.: 13/069,370

(22) Filed: Mar. 22, 2011

(65) Prior Publication Data

US 2012/0128079 A1 May 24, 2012

Related U.S. Application Data

(60) Provisional application No. 61/417,211, filed on Nov. 24, 2010.

(51) Int. Cl.
*H04B 1/38* (2015.01)
*H04B 3/54* (2006.01)

(52) U.S. Cl.
CPC ........................... *H04B 3/54* (2013.01)

(58) Field of Classification Search
USPC .................. 370/252, 257; 375/219, 222, 225
See application file for complete search history.

(56) References Cited

U.S. PATENT DOCUMENTS

| | | | | |
|---|---|---|---|---|
| 6,144,696 | A * | 11/2000 | Shively et al. | 375/222 |
| 6,940,913 | B2 * | 9/2005 | Verbin et al. | 375/260 |
| 2003/0108095 | A1 * | 6/2003 | Duvaut et al. | 375/222 |
| 2005/0180519 | A1 | 8/2005 | Betts | |
| 2007/0183456 | A1 | 8/2007 | Jain | |
| 2008/0205609 | A1 * | 8/2008 | Zhou | 379/93.08 |
| 2010/0027450 | A1 | 2/2010 | Montojo | |
| 2010/0109907 | A1 | 5/2010 | Sharma | |
| 2011/0080937 | A1 * | 4/2011 | Kim et al. | 375/219 |

FOREIGN PATENT DOCUMENTS

| | | |
|---|---|---|
| CN | 101047682 A | 10/2007 |
| CN | 101174855 A | 5/2008 |
| CN | 101036313 B | 5/2012 |
| WO | 2007033579 A1 | 3/2007 |

* cited by examiner

*Primary Examiner* — Edan Orgad
*Assistant Examiner* — Sithu Ko
(74) *Attorney, Agent, or Firm* — Winston Hsu; Scott Margo (57) ABSTRACT

The present discloses a dynamic transmit power control method for a power line communication (PLC) system. The dynamic transmit power control method includes steps of collecting a data; and adjusting a compliant transmit power spectrum density (PSD) mask according to a non-flat transmit PSD mask and the data; wherein the compliant transmit PSD mask complies with the non-flat transmit PSD mask, which comprises a plurality of reference PSDs corresponding to a plurality of frequency bands.

20 Claims, 7 Drawing Sheets

DYNAMIC TRANSMIT POWER CONTROL METHOD AND POWER LINE COMMUNICATION SYSTEM

CROSS REFERENCE TO RELATED APPLICATIONS

This application claims the benefit of U.S. Provisional Application No. 61/417,211, filed on Nov. 24, 2010 and entitled "DYNAMIC TRANSMIT POWER CONTROL OF PLC SYSTEM", the contents of which are incorporated herein by reference.

BACKGROUND OF THE INVENTION

1. Field of the Invention

The present invention relates to a dynamic transmit power control method and power line communication (PLC) system, and more particularly, to a dynamic transmit power control of PLC system capable of collecting communication data and/or predication data to generate performance related operations to maximize throughput.

2. Description of the Prior Art

In a power line communication system, adjustment of aggregate transmit power and/or Power Spectral Density (PSD) of active subcarriers to maximize the physical-layer throughput rate as a compliant Transmit PSD mask is required to comply with a transmit PSD mask according to regulations of different countries, i.e. PSDs of the compliant Transmit PSD mask are required to be equal to or lower than reference PSDs of the transmit PSD mask.

For example, a conventional power line communication system transmits signals only in a low frequency band, e.g. below 30 MHz, wherein reference PSDs of subcarriers of the low frequency band of the regulated transmit PSD mask are identical, i.e. a flat transmit PSD mask. Therefore, the conventional power line communication system transmits signals with PSDs of a compliant transmit PSD mask equal to the reference PSDs of the low frequency band of the transmit PSD mask since signals transmitted with higher PSDs result in higher throughput in a receiving end.

However, a current power line communication system may transmit signals across the low frequency band and high frequency bands, e.g. above 30 MHz, wherein reference PSDs of subcarriers of each of the high frequency bands of the transmit PSD mask are identical but the reference PSDs of each high frequency band are lower than those of the low frequency band, i.e. a non-flat transmit PSD mask. In such a situation, there is no specific operation/mechanism developed for the current power line communication system, and the above conventional operation/mechanism may result in a low throughput in a receiving end of the current power line communication system.

Thus, there is a need to develop operation/mechanism for the power line communication system complying with a non-flat transmit PSD mask.

SUMMARY OF THE INVENTION

It is therefore an object of the present invention to provide a dynamic transmit power control of PLC system capable of collecting communication data and/or predication data to generate performance related operations to maximize the throughput rate.

The present discloses a dynamic transmit power control method for a power line communication (PLC) system. The dynamic transmit power control method includes steps of collecting a data; and adjusting a compliant transmit power spectrum density (PSD) mask according to a non-flat transmit PSD mask and the data; wherein the compliant transmit PSD mask complies with the non-flat transmit PSD mask, which comprises a plurality of reference PSDs corresponding to a plurality of frequency bands.

The present further discloses a power line communication (PLC) system for dynamically controlling transmit power. The PLC system includes a receiving end; a power line; and a transmitting end, coupled to the receiving end via the power line, for collecting a data, and adjusting a compliant transmit power spectrum density (PSD) mask according to a non-flat transmit PSD mask and the data; wherein the compliant transmit PSD mask complies with the non-flat transmit PSD mask, which comprises a plurality of reference PSDs corresponding to a plurality of frequency bands.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
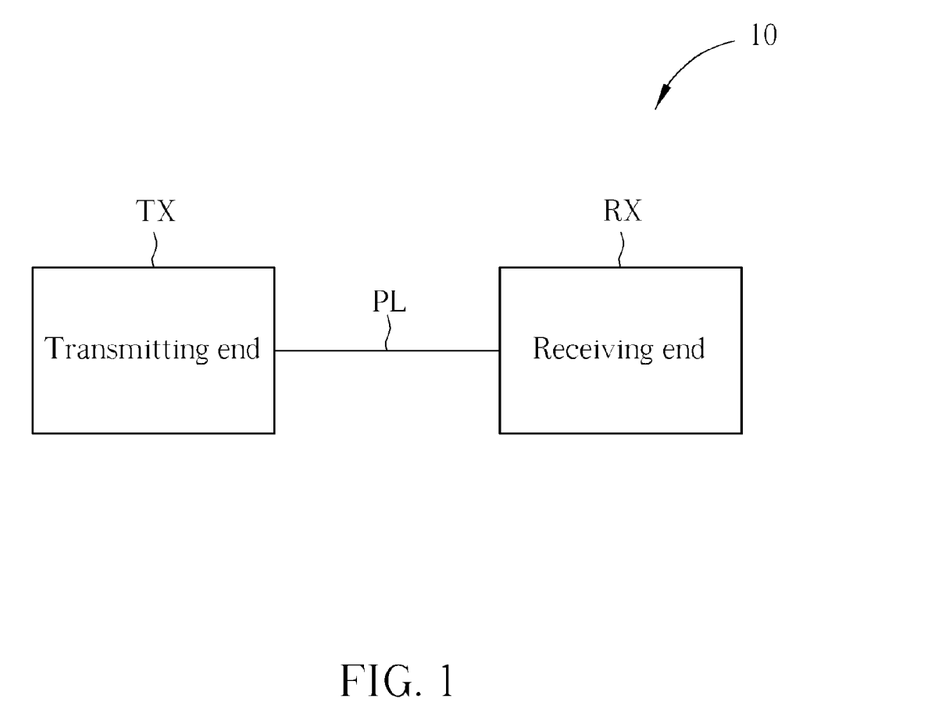
FIG. 1 is a schematic diagram of a power line communication system according to an embodiment of the present invention.

Please refer to FIG. 1, which is a schematic diagram of a power line communication (PLC) system 10 according to an embodiment of the present invention. The PLC system 10 is capable of dynamically controlling transmit power, and includes a receiving end RX, a power line PL and a transmitting end TX. The transmitting end TX is coupled to the receiving end RX via the power line PL, and the receiving end RX and the transmitting end TX comprise PLC modems, A/D converters, line drivers and other devices.

First, the transmitting end TX collects data, e.g. communication data such as given PSD or a constellation size of each subcarrier, and/or predication data such as received sound packet transmitted from the receiving end RX. Then, the transmitting end TX adjusts a compliant transmit power spectrum density (PSD) mask CMSK according to a non-flat transmit PSD mask NFMSK and the collected data, so as to transmit signals to the receiving end RX according to the compliant transmit PSD mask CMSK. The compliant transmit PSD mask CMSK complies with the non-flat transmit PSD mask NFMSK, which comprises a plurality of reference PSDs corresponding to a plurality of frequency bands, and each of the plurality of frequency bands comprises a plurality subcarriers. In other words, PSDs of the compliant transmit PSD mask CMSK are equal to or lower than the reference PSDs of the non-flat transmit PSD mask NFMSK. As a result, the transmitting end TX can collect the communication data and/or the predication data to generate performance related operations to maximize the throughput rate in the receiving end RX.

In detail, according to the non-flat transmit PSD mask NFMSK and the collected data such as the communication data and/or the predication data, the transmitting end TX can adjust the compliant transmit PSD mask CMSK via the following adjustment methods: (a) adjusting a maximum/minimum PSD corresponding to each of the plurality of frequency bands of the compliant transmit PSD mask CMSK in relative to the non-flat transmit PSD mask NFMSK, (b) adjusting aggregate transmit power of the compliant transmit PSD mask CMSK, (c) performing power cutback on subcarriers of the plurality of frequency bands of the compliant transmit PSD mask CMSK, or (d) performing gain scaling on the subcarriers of the plurality of frequency bands of the compliant transmit PSD mask CMSK in relative to the non-flat transmit PSD mask NFMSK.

Noticeably, the adjustment methods (a)-(d) can be applied separately or in any combination according to practical requirements. For example, the adjustment method (d) can be utilized for finely adjusting spectrum shaping in relative to either the non-flat transmit PSD mask NFMSK, or the compliant transmit PSD mask CMSK adjusted by the adjustment method (a), i.e. combination of the adjustment methods (a) and (d), so as to generate the desirable compliant transmit PSD mask CMSK. As a result, the adjustment methods (a)-(d) can generate better Signal-Noise ratio (SNR) in the receiving end RX in some of the subcarriers due to a limited SNR dynamic range supported by the receiving A/D converter of the receiving end RX, so as to provide a better receiving throughput in the receiving end RX.

Figure 2A:
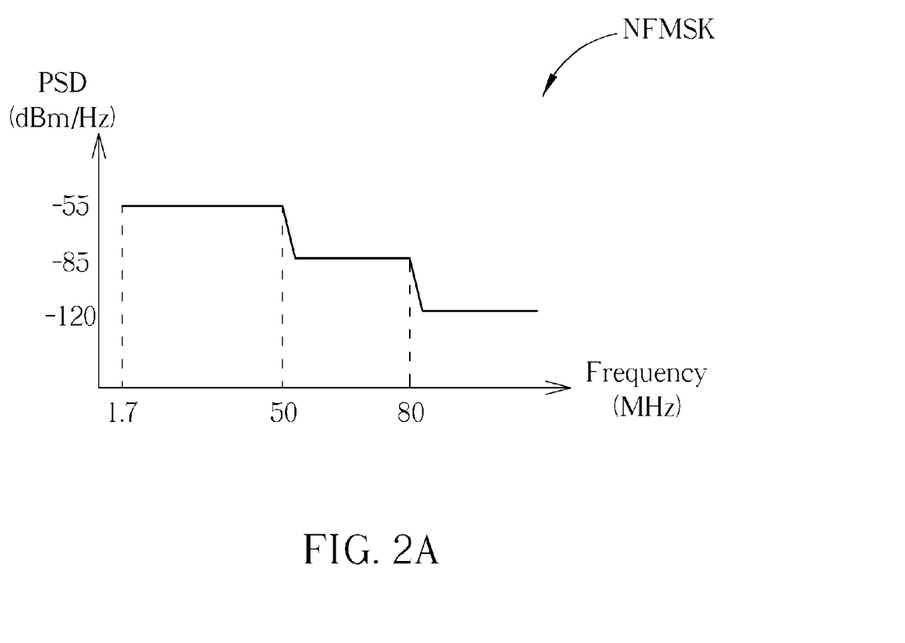
FIG. 2A is a schematic diagram of a non-flat transmit PSD mask according to an embodiment of the present invention.
Figure 2B:
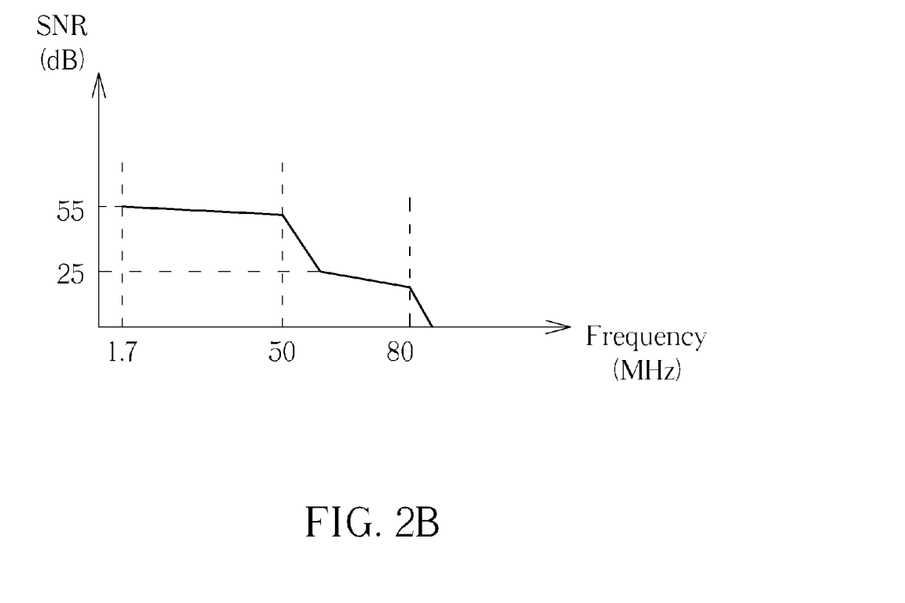
FIG. 2B is a schematic diagram of SNR of signals received by a receiving end shown in FIG. 1 when a compliant transmit PSD mask is identical to the non-flat transmit PSD mask shown in FIG. 2A.

Specifically, please refer to FIG. 2A and FIG. 2B. FIG. 2A is a schematic diagram of the non-flat transmit PSD mask NFMSK according to an embodiment of the present invention, wherein reference PSDs corresponding to different frequency bands are −55, −85 and −120 dBm/Hz, respectively. FIG. 2B is a schematic diagram of SNR of signals received by the receiving end RX shown in FIG. 1 when the compliant transmit PSD mask CMSK is identical to the non-flat transmit PSD mask NFMSK shown in FIG. 2A. As shown in FIG. 2A, when the compliant transmit PSD mask CMSK is identical to the non-flat transmit PSD mask NFMSK, i.e. no transmit PSD adjustment in relative to the non-flat transmit PSD mask NFMSK, operation/mechanism of the PLC system 10 is similar to that of the conventional power line communication system. Under such a situation, analog received power-gain control will drive the quantization noise of the A/D converter of the receiving end RX higher than channel noise since PSD difference between different frequency bands is high and the A/D converter can only process received signals within a limited PSD range without great quantization noise. As a result, as shown in FIG. 2B, subcarriers of frequency bands with lower reference PSDs only have lower SNRs (below 25 dB), such that the conventional operation/mechanism can only result in low receiving throughput in the receiving end RX of the PLC system 10 complying with the non-flat transmit PSD mask NFMSK.

In comparison, according to the adjustment method (a) adjusting a maximum/minimum PSD corresponding to each of the plurality of frequency bands of the compliant transmit PSD mask CMSK in relative to the non-flat transmit PSD mask NFMSK, the transmitting end TX can lower a maximum PSD corresponding to a frequency band of the compliant transmit PSD mask CMSK than a maximum reference PSD corresponding to the frequency band of the non-flat transmit PSD mask NFMSK, wherein the maximum reference PSD is the greatest one among the plurality of reference PSDs.

Figure 2C:
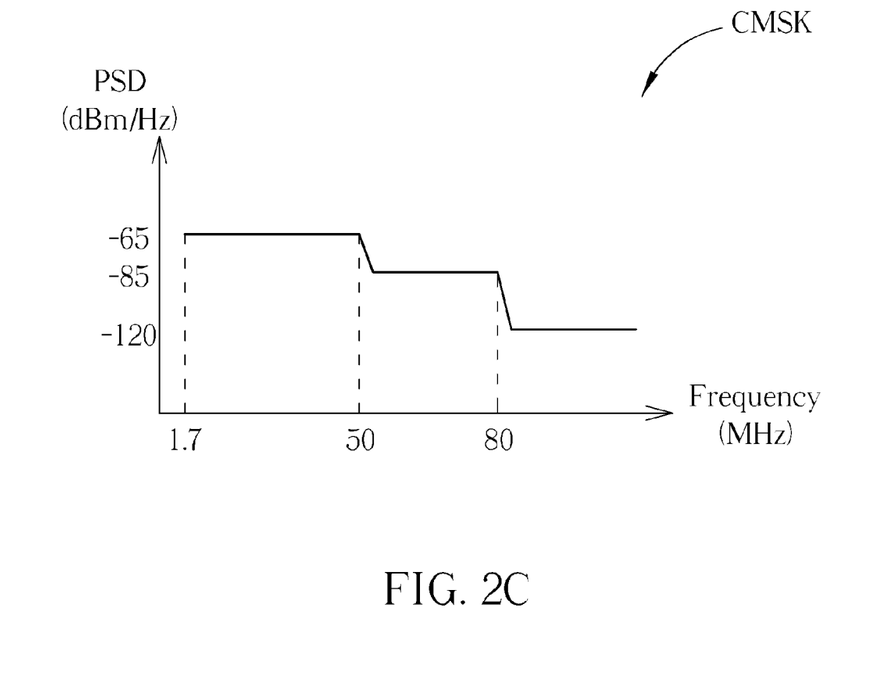
FIG. 2C is a schematic diagram of a compliant transmit PSD mask adjusted by the transmitting end shown in FIG. 1 according to an embodiment of the present invention.
Figure 2D:
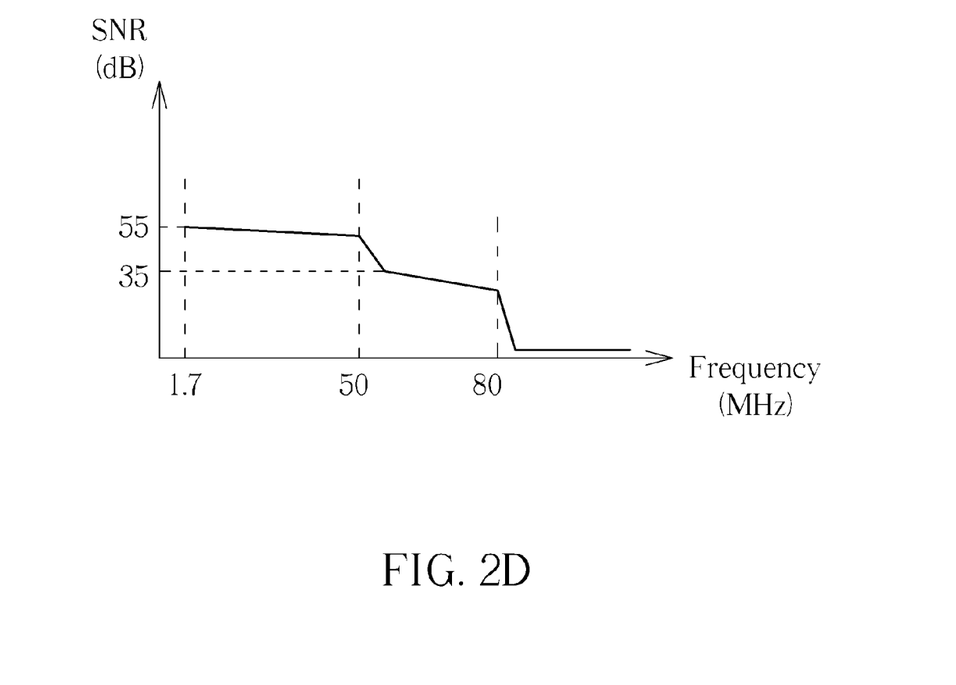
FIG. 2D is a schematic diagram of SNR of signals received by the receiving end shown in FIG. 1 when applying the compliant transmit PSD mask shown in FIG. 2C according to an embodiment of the present invention.

Specifically, please refer to FIG. 2C and FIG. 2D. FIG. 2C is a schematic diagram of the compliant transmit PSD mask CMSK adjusted by the transmitting end TX shown in FIG. 1 according to an embodiment of the present invention, wherein PSDs corresponding to different frequency bands are −65, −85 and −120 dBm/Hz, respectively. FIG. 2D is a schematic diagram of SNR of signals received by the receiving end RX shown in FIG. 1 when applying the compliant transmit PSD mask CMSK shown in FIG. 2C according to an embodiment of the present invention. As shown in FIG. 2A and FIG. 2C, a maximum PSD, i.e. −65 dBm/Hz, is lower than a maximum reference PSD, i.e. −55 dBm/Hz. Under such a situation, as shown in FIG. 2D, SNRs of those subcarriers with lower PSDs will be improved (from 25 to 35 dB) since PSD difference between different frequency bands is lower and the A/D converter can process received signals within a narrower PSD range with lower quantization noise. As a result, the PLC system 10 complying with the non-flat transmit PSD mask NFMSK can provide a better receiving throughput in the receiving end RX by lowering the maximum PSD.

On the other hand, when power of received signals is too high, e.g. the power line PL is short and thus low attenuation, the receiving end RX cannot perform analog operations well due to distortion by high power, and thus has poor throughput. Under such a situation, when the communication data and/or the predication data, e.g. feedback signal or sound packet, indicate that received power may be too high, the transmitting end TX can apply the adjustment method (b) adjusting aggregate transmit power of the compliant transmit PSD mask CMSK, e.g. by lowering power driven by a line driver, or (c) performing power cutback on subcarriers of the plurality of frequency bands of the compliant transmit PSD mask CMSK. As a result, the PLC system 10 complying with the non-flat transmit PSD mask NFMSK can provide a better receiving throughput in the receiving end RX by lowering aggregate transmit power or performing power cutback on subcarriers.

Figure 3A:
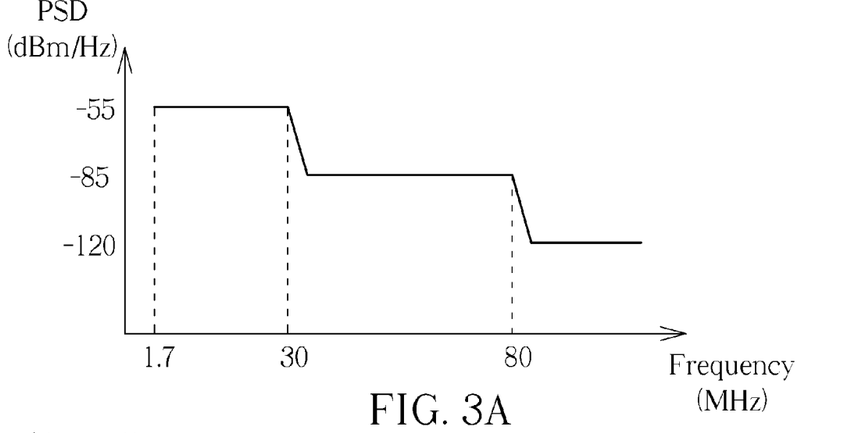
FIG. 3A is a schematic diagram of a non-flat transmit PSD mask according to another embodiment of the present invention.
Figure 3B:
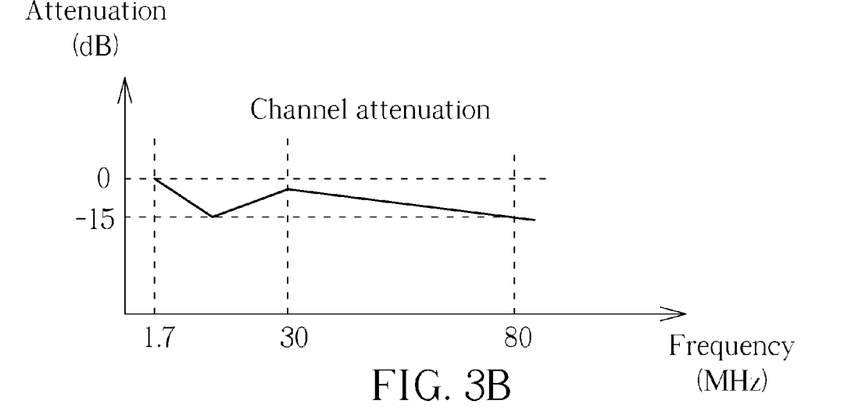
FIG. 3B is a schematic diagram of channel attenuation of a power line shown FIG. 1 in according to an embodiment of the present invention.
Figure 3C:
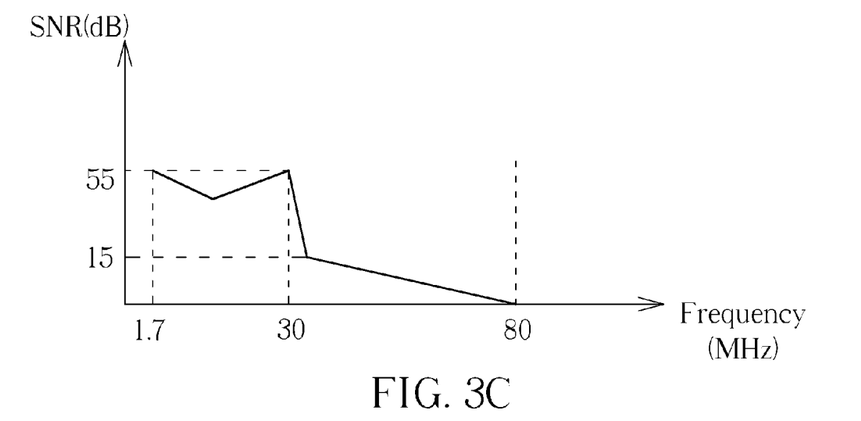
FIG. 3C is a schematic diagram of SNR of signals received by the receiving end shown FIG. 1 when a compliant transmit PSD mask is identical to the non-flat transmit PSD mask shown in FIG. 3A and the power line shown FIG. 1 has the channel attenuation as shown in FIG. 3B according to an embodiment of the present invention.

Furthermore, please refer to FIG. 3A to FIG. 3C. FIG. 3A is a schematic diagram of the non-flat transmit PSD mask NFMSK according to another embodiment of the present invention, wherein reference PSDs corresponding to different frequency bands are −55, −85 and −120 dBm/Hz, respectively, but ranges of frequency bands are different to those shown in FIG. 2A. FIG. 3B is a schematic diagram of channel attenuation of the power line PL shown FIG. 1 according to an embodiment of the present invention. FIG. 3C is a schematic diagram of SNR of signals received by the receiving end RX shown FIG. 1 when the compliant transmit PSD mask CMSK is identical to the non-flat transmit PSD mask NFMSK shown in FIG. 3A and the power line PL has channel attenuation as shown in FIG. 3B according to an embodiment of the present invention. Compared with FIG. 2B, SNRs of subcarriers shown in FIG. 3C are further influenced by the channel attenuation shown in FIG. 3B (below 15 dB). As a result, subcarriers corresponding to more channel attenuation have lower SNRs.

In comparison, since a Time-Division Multiplexing (TDM) power line communication system, upstream and downstream use the same frequency band, the transmitting end TX can coarsely estimate the channel attenuation due to the non-rapid variation characteristic in power line channel according to received packets, e.g. sounding packet, of the collected predication data. In such a situation, according to the adjustment method (d) performing gain scaling on the subcarriers of the plurality of frequency bands of the compliant transmit PSD mask CMSK in relative to the non-flat transmit PSD mask NFMSK, the transmitting end TX can perform gain scaling on the subcarriers of the plurality of frequency bands of the compliant transmit PSD mask CMSK according to the prediction data indicating channel attenuation of a transmission channel of the power line PL, so as to compensate the channel attenuation.

Figure 4A:
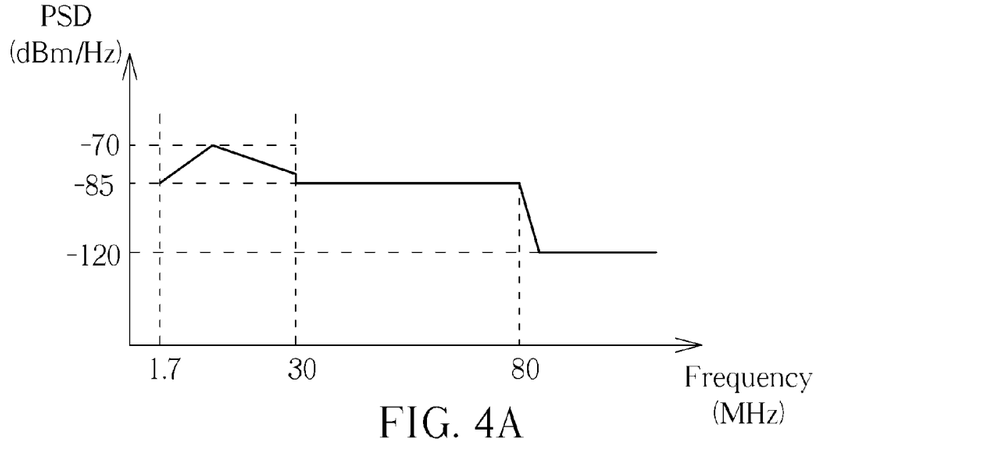
FIG. 4A is a schematic diagram of a compliant transmit PSD mask adjusted by the transmitting end shown in FIG. 1 according to an embodiment of the present invention.
Figure 4B:
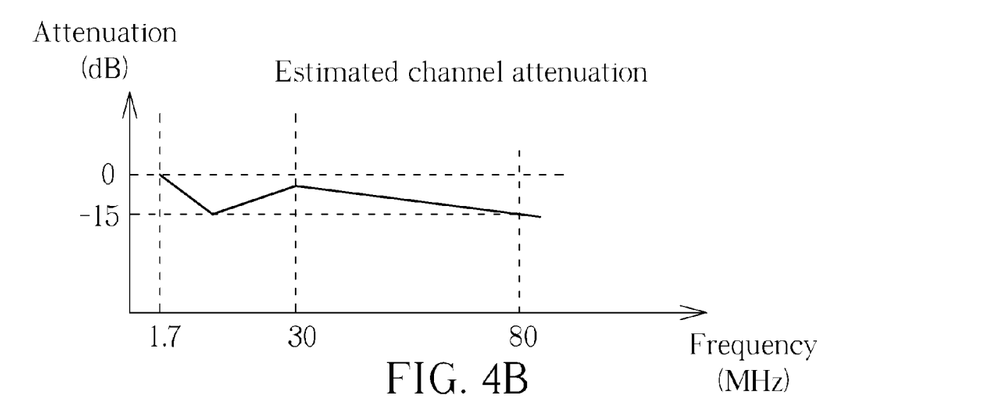
FIG. 4B is a schematic diagram of estimated channel attenuation of a power line shown FIG. 1 according to an embodiment of the present invention.
Figure 4C:
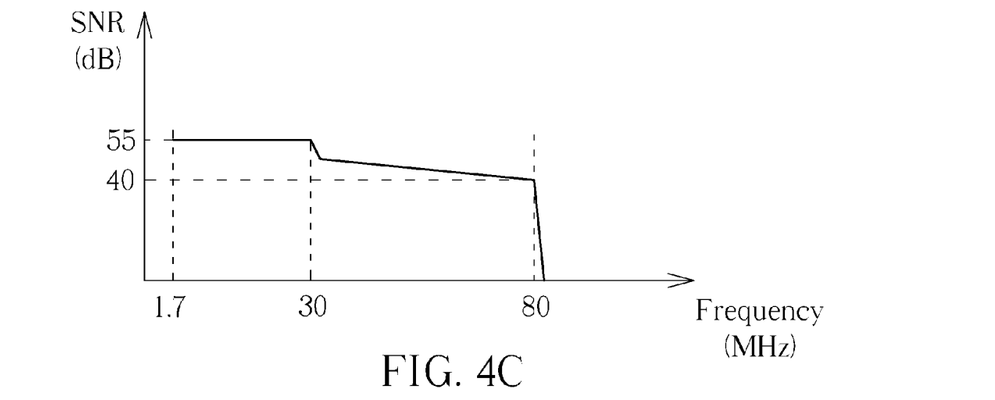
FIG. 4C is a schematic diagram of SNR of signals received by the receiving end when applying the compliant transmit PSD mask shown in FIG. 4A.

Specifically, please refer to FIG. 4A to FIG. 4C. FIG. 4A is a schematic diagram of the compliant transmit PSD mask CMSK adjusted by the transmitting end TX shown in FIG. 1 according to an embodiment of the present invention. FIG. 4B is a schematic diagram of estimated channel attenuation of the power line PL according to an embodiment of the present invention, and is substantially identical to FIG. 3B for simplicity. FIG. 4C is a schematic diagram of SNR of signals received by the receiving end RX when applying the compliant transmit PSD mask CMSK shown in FIG. 4A. As shown in FIG. 4A and FIG. 4B, the transmitting end TX collects the predication data to estimate channel attenuation of the power line PL first, and then performs gain scaling on the subcarriers to compensate the channel attenuation while lowering a maximum PSD, i.e. −70 dBm/Hz, than a maximum reference PSD, i.e. −55 dBm/Hz. In other words, the transmitting end TX combines the adjustment methods (a) and (d). Under such a situation, as shown in FIG. 4C, SNRs of those subcarriers with lower PSDs will be improved (from 15 to 40 dB). As a result, the PLC system 10 complying with the non-flat transmit PSD mask NFMSK can provide a better receiving throughput in the receiving end RX by lowering the maximum PSD and gain scaling on the subcarriers.

Noticeably, the spirit of the present invention is to adjust the compliant transmit PSD mask CMSK according to the non-flat transmit PSD mask NFMSK and the data comprising the communication data and/or the predication data, so as to dynamically control transmit power to maximize the throughput rate of the receiving end RX. Those skilled in the art should make modifications or alterations accordingly. For example, any communication system complies with a non-flat transmit PSD mask can apply the adjustment methods of the present invention to improve throughput; any combination of the adjustment methods (a)-(d) can be applied while retaining merit of each adjustment method, e.g. the adjustment method (b) or (c) can be combined with the adjustment methods (a) and/or (d) when the power line PL is short, and is not limited to the above combination of the adjustment methods (a) and (d).

Figure 5:
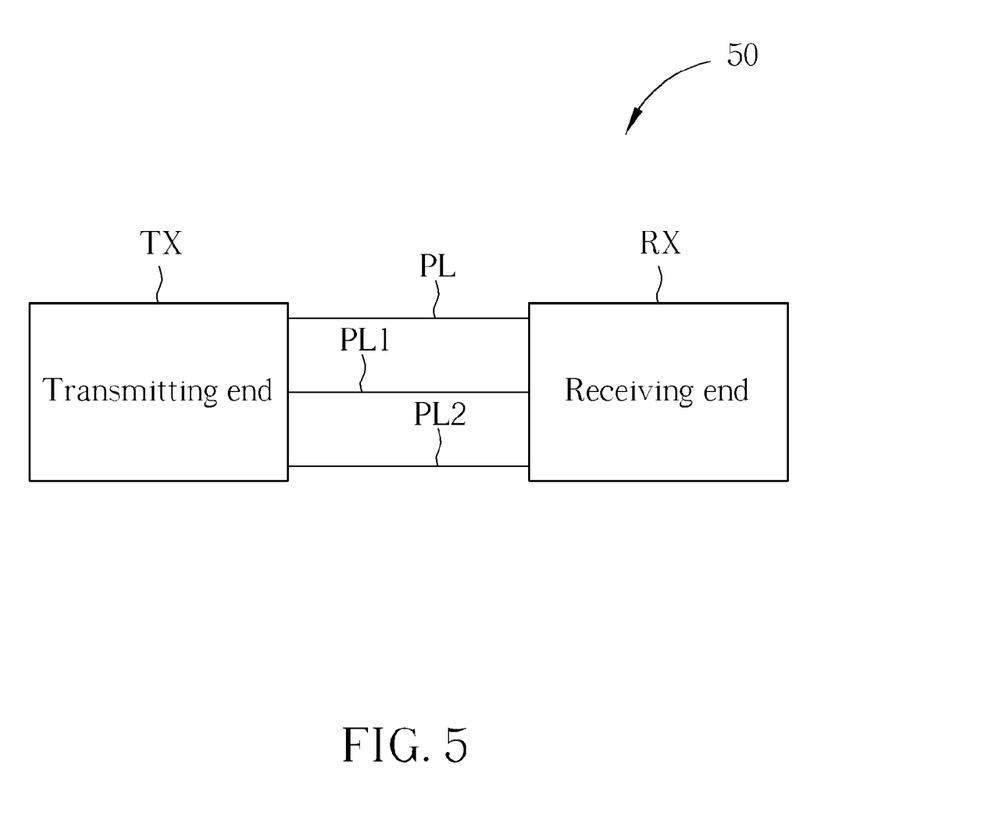
FIG. 5 is a schematic diagram of a PLC system according to an alteration of the present invention.

Moreover, other than channel attenuation, the present inventions can be applied for compensating other non-ideal factor. For example, the transmitting end TX and the receiving end RX can be coupled by more than one power line, wherein a power line may induce coupling on another power line. Please refer to FIG. 5, which is a schematic diagram of a PLC system 50 according to an alteration of the present invention. Difference between the PLC system 50 and the PLC system 10 is that the transmitting end TX and the receiving end RX are coupled by three power lines PL, PL1, PL2. Under such a situation, the prediction data can indicate a coupling effect by another transmission channel of another power line. For example, when the receiving end RX sends a sounding packet to the transmitting end TX via the power line PL, the transmitting end TX can estimate induced coupling effects on transmission channels of the powers lines PL1, PL2 by the transmission channel of the power line PL. By the same token, coupling effects on each power line induced by other power lines can be derived. As a result, similar to the above-mentioned adjustment methods for compensating channel attenuation or any combination of the adjustment methods (a)-(d), the transmitting end TX can compensate coupling effects induced by other power lines, so as to improve throughput.

Figure 6:
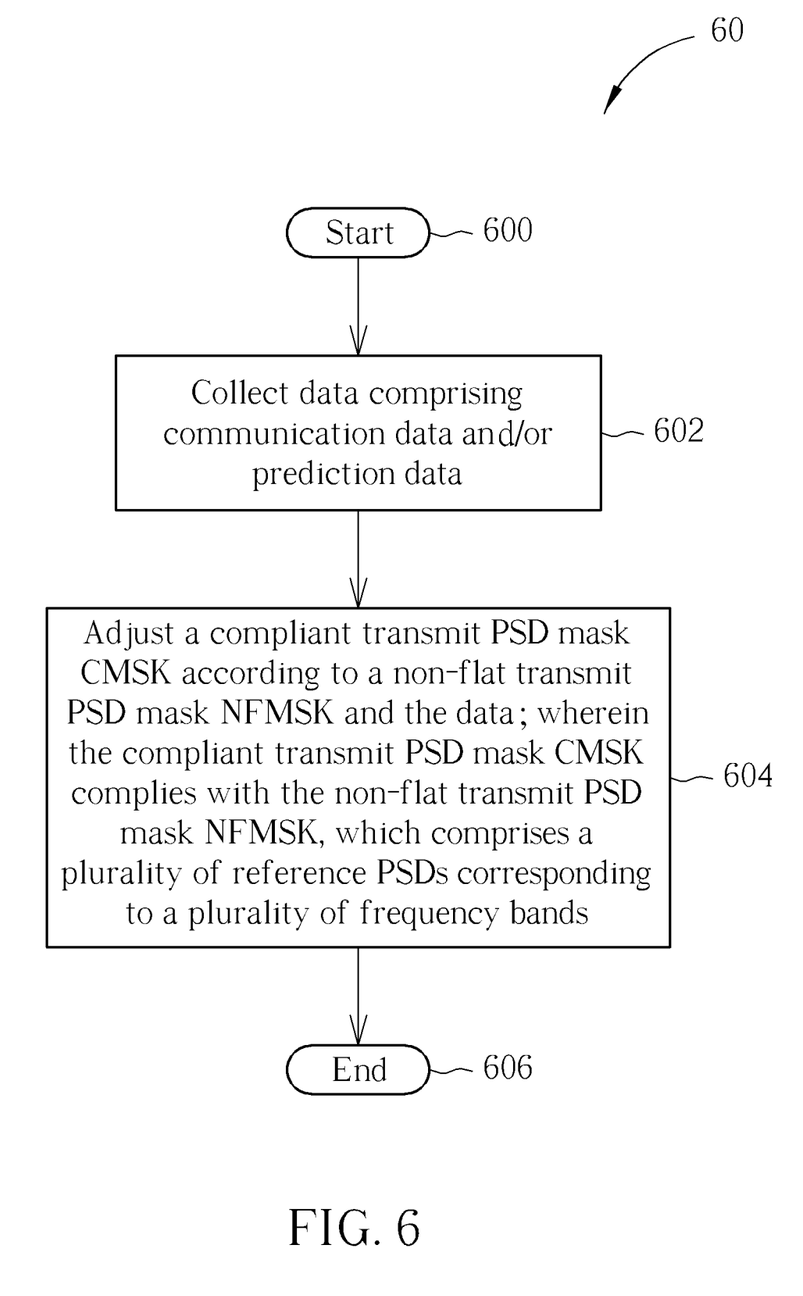
FIG. 6 is a dynamic transmit power control process according to an embodiment of the present invention.

Operations of the PLC system 10 can be summarized into a dynamic transmit power control process 60 as shown in FIG. 6. The dynamic transmit power control process 60 includes the following steps:

Step 600: Start.

Step 602: Collect data comprising communication data and/or prediction data.

Step 604: Adjust a compliant transmit PSD mask CMSK according to a non-flat transmit PSD mask NFMSK and the data; wherein the compliant transmit PSD mask CMSK complies with the non-flat transmit PSD mask NFMSK, which comprises a plurality of reference PSDs corresponding to a plurality of frequency bands.

Step 606: End.

Details of the dynamic transmit power control process 60 can be derived by referring to the above description.

To sum up, convention operation/mechanism only results in low throughput in a receiving end of a power line communication system complying with a non-flat transmit PSD mask. In comparison, the present invention adjusts the compliant transmit PSD mask CMSK according to the non-flat transmit PSD mask NFMSK and the data comprising the communication data or and/or the predication data, so as to dynamically control transmit power to maximize the throughput rate of the receiving end RX of a PLC system complying with the non-flat transmit PSD mask NFMSK.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dynamic transmit power control method for a power line communication (PLC) system, the dynamic transmit power control method comprising:
   collecting a data; and
   adjusting a compliant transmit power spectrum density (PSD) mask according to a non-flat transmit PSD mask and the data;

wherein the compliant transmit PSD mask complies with the non-flat transmit PSD mask, which comprises a plurality of reference PSDs corresponding to a plurality of frequency bands;
wherein the step of adjusting the compliant transmit PSD mask according to the non-flat transmit PSD mask and the data comprises:
adjusting aggregate transmit power of the compliant transmit PSD mask according to the data collected from a receiving end.

2. The dynamic transmit power control method of claim 1, wherein the data comprises a communication data or a prediction data.

3. The dynamic transmit power control method of claim 1, wherein the step of adjusting the compliant transmit PSD mask according to the non-flat transmit PSD mask and the data comprises:
adjusting a maximum/minimum PSD corresponding to each of the plurality of frequency bands of the compliant transmit PSD mask in relative to the non-flat transmit PSD mask.

4. The dynamic transmit power control method of claim 3, wherein the step of adjusting the maximum/minimum PSD corresponding to each of the plurality of frequency bands of the compliant transmit PSD mask in relative to the non-flat transmit PSD mask comprises:
lowering a maximum PSD corresponding to a frequency band of the compliant transmit PSD mask than a maximum reference PSD corresponding to the frequency band of the non-flat transmit PSD mask;
wherein the maximum reference PSD is greatest among the plurality of reference PSDs.

5. The dynamic transmit power control method of claim 3 further comprising:
performing gain scaling on subcarriers of the plurality of frequency bands of the compliant transmit PSD mask.

6. The dynamic transmit power control method of claim 1, wherein the step of adjusting the compliant transmit PSD mask according to the non-flat transmit PSD mask and the data comprises:
performing power cutback on subcarriers of the plurality of frequency bands of the compliant transmit PSD mask.

7. The dynamic transmit power control method of claim 1, wherein the step of adjusting the compliant transmit PSD mask according to the non-flat transmit PSD mask and the data comprises:
performing gain scaling on subcarriers of the plurality of frequency bands of the compliant transmit PSD mask in relative to the non-flat transmit PSD mask.

8. The dynamic transmit power control method of claim 7, wherein the step of performing gain scaling on the subcarriers of the plurality of frequency bands of the compliant transmit PSD mask in relative to the non-flat transmit PSD mask comprises:
performing gain scaling on the subcarriers of the plurality of frequency bands of the compliant transmit PSD mask according to a prediction data indicating channel attenuation of a transmission channel.

9. The dynamic transmit power control method of claim 2, wherein prediction data indicates a coupling effect induced by another transmission channel.

10. A power line communication (PLC) system for dynamically controlling transmit power, comprising:
a receiving end;
a power line; and
a transmitting end, coupled to the receiving end via the power line, for collecting a data, and adjusting a compliant transmit power spectrum density (PSD) mask according to a non-flat transmit PSD mask and the data;
wherein the compliant transmit PSD mask complies with the non-flat transmit PSD mask, which comprises a plurality of reference PSDs corresponding to a plurality of frequency bands, and the transmitting end adjusts aggregate transmit power of the compliant transmit PSD mask according to the data collected from the receiving end.

11. The dynamic transmit power control method of claim 10, wherein the data comprises a communication data or a prediction data.

12. The dynamic transmit power control method of claim 10, wherein the transmitting end adjusts a maximum/minimum PSD corresponding to each of the plurality of frequency bands of the compliant transmit PSD mask in relative to the non-flat transmit PSD mask.

13. The dynamic transmit power control method of claim 12, wherein the transmitting end lowers a maximum PSD corresponding to a frequency band of the compliant transmit PSD mask than a maximum reference PSD corresponding to the frequency band of the non-flat transmit PSD mask, wherein the maximum reference PSD is greatest among the plurality of reference PSDs.

14. The dynamic transmit power control method of claim 12, wherein the transmitting end further performs gain scaling on subcarriers of the plurality of frequency bands of the compliant transmit PSD mask.

15. The dynamic transmit power control method of claim 10, wherein the transmitting end performs power cutback on subcarriers of the plurality of frequency bands of the compliant transmit PSD mask.

16. The dynamic transmit power control method of claim 10, wherein the transmitting end performs gain scaling on subcarriers of the plurality of frequency bands of the compliant transmit PSD mask in relative to the non-flat transmit PSD mask.

17. The dynamic transmit power control method of claim 16, wherein the transmitting end performs gain scaling on the subcarriers of the plurality of frequency bands of the compliant transmit PSD mask according to a prediction data indicating channel attenuation of a transmission channel of the power line.

18. The dynamic transmit power control method of claim 11, wherein the prediction data indicates a coupling effect induced by another transmission channel of another power line.

19. A dynamic transmit power control method for a power line communication (PLC) system, the dynamic transmit power control method comprising:
collecting a data; and
adjusting a compliant transmit power spectrum density (PSD) mask according to a non-flat transmit PSD mask and the data;
wherein the compliant transmit PSD mask complies with the non-flat transmit PSD mask, which comprises a plurality of reference PSDs corresponding to a plurality of frequency bands;
wherein the step of adjusting the compliant transmit PSD mask according to the non-flat transmit PSD mask and the data comprises:
performing gain scaling on subcarriers of the plurality of frequency bands of the compliant transmit PSD mask in relative to the non-flat transmit PSD mask according to a prediction data indicating channel attenuation of a transmission channel by a transmitting end.

20. A power line communication (PLC) system for dynamically controlling transmit power, comprising:

a receiving end;
a power line; and
a transmitting end, coupled to the receiving end via the power line, for collecting a data, and adjusting a compliant transmit power spectrum density (PSD) mask according to a non-flat transmit PSD mask and the data;
wherein the compliant transmit PSD mask complies with the non-flat transmit PSD mask, which comprises a plurality of reference PSDs corresponding to a plurality of frequency bands, and the transmitting end performs gain scaling on subcarriers of the plurality of frequency bands of the compliant transmit PSD mask in relative to the non-flat transmit PSD mask according to a prediction data indicating channel attenuation of a transmission channel of the power line.

* * * * *